US008494047B2

(12) United States Patent
Wada et al.

(10) Patent No.: US 8,494,047 B2
(45) Date of Patent: Jul. 23, 2013

(54) ENCODING DEVICE, METHOD FOR ADJUSTING TARGET AMOUNT OF CODE AND RECORD MEDIUM (75) Inventors: Yuji Wada, Tokyo (JP); Koichi Yoshimura, Chiba (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 12/651,009

(22) Filed: Dec. 31, 2009

(65) Prior Publication Data

US 2010/0172410 A1  Jul. 8, 2010

(30) Foreign Application Priority Data

Jan. 7, 2009  (JP) ................................ 2009-001891

(51) Int. Cl.
*H04N 7/12* (2006.01)
(52) U.S. Cl.
USPC ................................................... 375/240.02
(58) Field of Classification Search
USPC ................ 375/240, 240.01, 240.02
See application file for complete search history.

(56) References Cited

U.S. PATENT DOCUMENTS

| 4,827,338 | A | * | 5/1989 | Gerard | 375/240.18 |
| 5,731,835 | A | | 3/1998 | Kuchibholta | |
| 5,835,149 | A | * | 11/1998 | Astle | 375/240.05 |
| 5,959,674 | A | * | 9/1999 | Jang et al. | 375/240.2 |
| 6,714,592 | B1 | * | 3/2004 | Liu et al. | 375/240.13 |
| 6,731,684 | B1 | * | 5/2004 | Wu | 375/240.12 |
| 2006/0008003 | A1 | * | 1/2006 | Ji et al. | 375/240.11 |
| 2006/0039471 | A1 | * | 2/2006 | Dane et al. | 375/240.16 |
| 2010/0135386 | A1 | * | 6/2010 | Shibata et al. | 375/240.03 |

FOREIGN PATENT DOCUMENTS

| JP | 9-98415 | 4/1997 |
| JP | 2000-505615 | 5/2000 |
| JP | 2001-8215 | 1/2001 |
| JP | 2008-78978 | 4/2008 |

OTHER PUBLICATIONS

The Journal of the Institute of Television Engineers of Japan, vol. 49, No. 4, 1995, 9 pages (with English Translation).
Japanese Office Action issued Jan. 13, 2011, in Patent Application No. 2009-001891.
U.S. Appl. No. 13/442,199, filed Apr. 9, 2012, Wada.

* cited by examiner

*Primary Examiner* — Allen Wong
(74) *Attorney, Agent, or Firm* — Oblon, Spivak, McClelland, Maier & Neustadt, L.L.P.

(57) ABSTRACT

An encoding device includes an encoding unit that encodes image data, a computing unit that calculates a target amount of picture code for each picture when the image data is encoded, a selection unit that selects an adjustment coefficient corresponding to the position of a picture within a unit of image processing from adjustment coefficients that have an alternating sequence of maximum values and minimal values, and an adjusting unit that adjusts the target amount of picture code by multiplying the target amount of picture code calculated by the computing unit by the adjustment coefficient selected by the selection unit.

15 Claims, 8 Drawing Sheets

ENCODING DEVICE, METHOD FOR ADJUSTING TARGET AMOUNT OF CODE AND RECORD MEDIUM

BACKGROUND OF THE INVENTION

1. Field of the Invention

The present invention relates to an encoding device, a method for adjusting target amounts of code and a record medium, which are suitably applicable to image processing devices, such as an encoder, that encode image data in conformity with coding standards, for example, MPEG (Moving Picture Experts Group).

2. Description of the Related Art

Figure 1A:
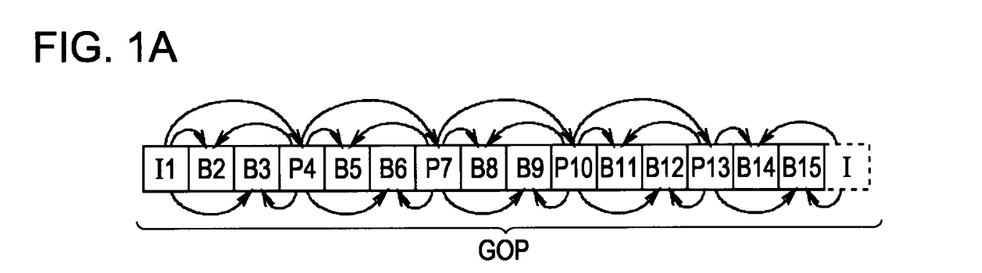
FIGS. 1A and 1B are diagrammatic views illustrating a typical rate control technique (1) according to STEP 1.

A technique of encoding image data using an encoder before recording and distributing the image and decoding the encoded image data by using a decoder before displaying the image is widely and frequently used. In MPEG-2, as shown in FIG. 1A, a group of pictures (GOPs) is formed with, for example, 15 pictures and serves as a unit of pictures in a repeating sequence.

The MPEG-2 system defines three types of pictures: I-picture; P-picture; and B-picture. The I-picture is generated by using intra-frame coding without changing the pixel values thereof. The P-picture is generated by using forward prediction with reference to a preceding I- or P-picture. The B-picture is generated by using bidirectional prediction with reference to a preceding and following I- or P-picture.

The rate control of each picture according to the MPEG-2 system is proposed in STEP 1 of Test Model (TM) 5. In STEP 1, for the purpose of decreasing the difference in image quality of pictures in a GOP, a difference in amount of code between a target amount of GOP code, which is a target amount of code available to the GOP, and a generation code amount, which is an amount of generated code upon encoding a picture, is accumulated in a virtual buffer. Then, in STEP 1, a target amount of picture code is allocated to pictures, which will be encoded, in accordance with the difference in amount of code and the picture type.

Figure 1B:
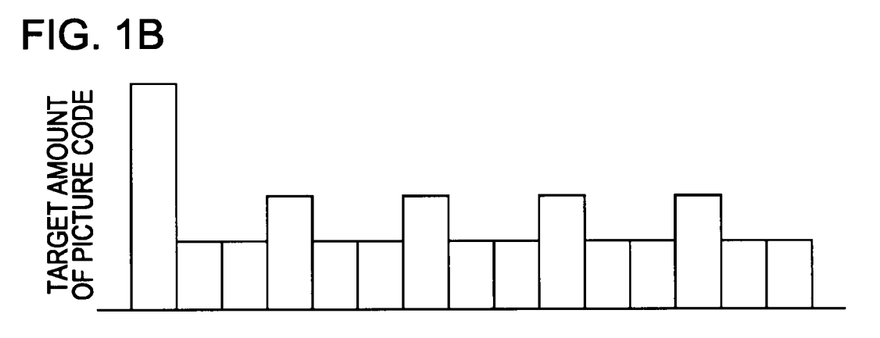

As shown in FIG. 1B, in STEP 1, large target amounts of picture code are allocated to the I-picture and P-pictures used as a reference image, whereas the B-pictures, which are not used as a reference image, are to be allocated with smaller target amounts of picture code than those for the I-picture and P-pictures (see, e.g., Japanese Unexamined Patent Application Publication No. 2008-78978).

SUMMARY OF THE INVENTION

The above-described encoder is demanded to further improve image quality in bit streams.

The present invention has been made in view of the aforementioned encoding technique and the demand therefor and provides an encoding device, a method for adjusting target amounts of code and a record medium storing a program for adjusting the target amounts of code, those of which are provided for improving image quality in bit streams.

To meet the demand, the encoding device of the present invention includes an encoding unit that encodes image data, a computing unit that calculates target amounts of picture code when the image data is encoded so as to be substantially uniform for pictures of the same type, a selection unit that selects an adjustment coefficient corresponding to the position of a picture within a unit of image processing from adjustment coefficients that have an alternating sequence of maximum values and minimal values, and an adjusting unit that adjusts the target amount of picture code by multiplying the target amount of picture code determined by the computing unit by the adjustment coefficient selected by the selection unit.

The encoding device can improve image quality of pictures associated with the maximum values, while encoding pictures associated with the minimal values with reference to the pictures associated with the maximum values, thereby reducing deterioration of image quality.

The method for adjusting target amounts of code of the present invention includes the steps of calculating target amounts of picture code when image data is encoded so as to be substantially uniform for pictures of the same type, selecting an adjustment coefficient corresponding to the position of a picture in a unit of image processing from adjustment coefficients that have an alternating sequence of maximum values and minimal values, and adjusting the target amount of picture code by multiplying the target amount of picture code calculated by the computing unit by the adjustment coefficient selected by the selection unit.

The method can improve image quality of pictures associated with the maximum values, while encoding pictures associated with the minimal values with reference to the pictures associated with the maximum values, thereby reducing deterioration of image quality.

Furthermore, a program stored in a record medium of the present invention includes the steps of calculating target amounts of picture code when image data is encoded so as to be substantially uniform for pictures of the same type, selecting an adjustment coefficient corresponding to the position of a picture in a unit of image processing from adjustment coefficients that have an alternating sequence of maximum values and minimal values, and adjusting the target amount of picture code by multiplying the target amount of picture code calculated by the computing unit by the adjustment coefficient selected by the selection unit.

This can improve image quality of pictures associated with the maximum values, while encoding pictures associated with the minimal values with reference to the pictures associated with the maximum values, thereby reducing deterioration of image quality.

According to the present invention, the image quality of the pictures associated with the maximum values can be improved, and the image quality of the pictures associated with the minimal values can be prevented from deteriorating by encoding the pictures associated with the minimal values with reference to the pictures associated with the maximum values. Thus, the present invention can realize an encoding device, a method for adjusting target amounts of code, a record medium storing a program for adjusting the target amounts of code, which are capable of improving image quality in bit streams.

DESCRIPTION OF THE PREFERRED EMBODIMENTS

With reference to the drawings, detailed descriptions of embodiments of the present invention will be provided in the following order.

1. First embodiment (details of rate control: including only an I-picture and P-pictures)
2. Second embodiment (including B-pictures)
3. Other embodiments

1. First Embodiment

[1-1. Structure of Encoder]

Figure 2:
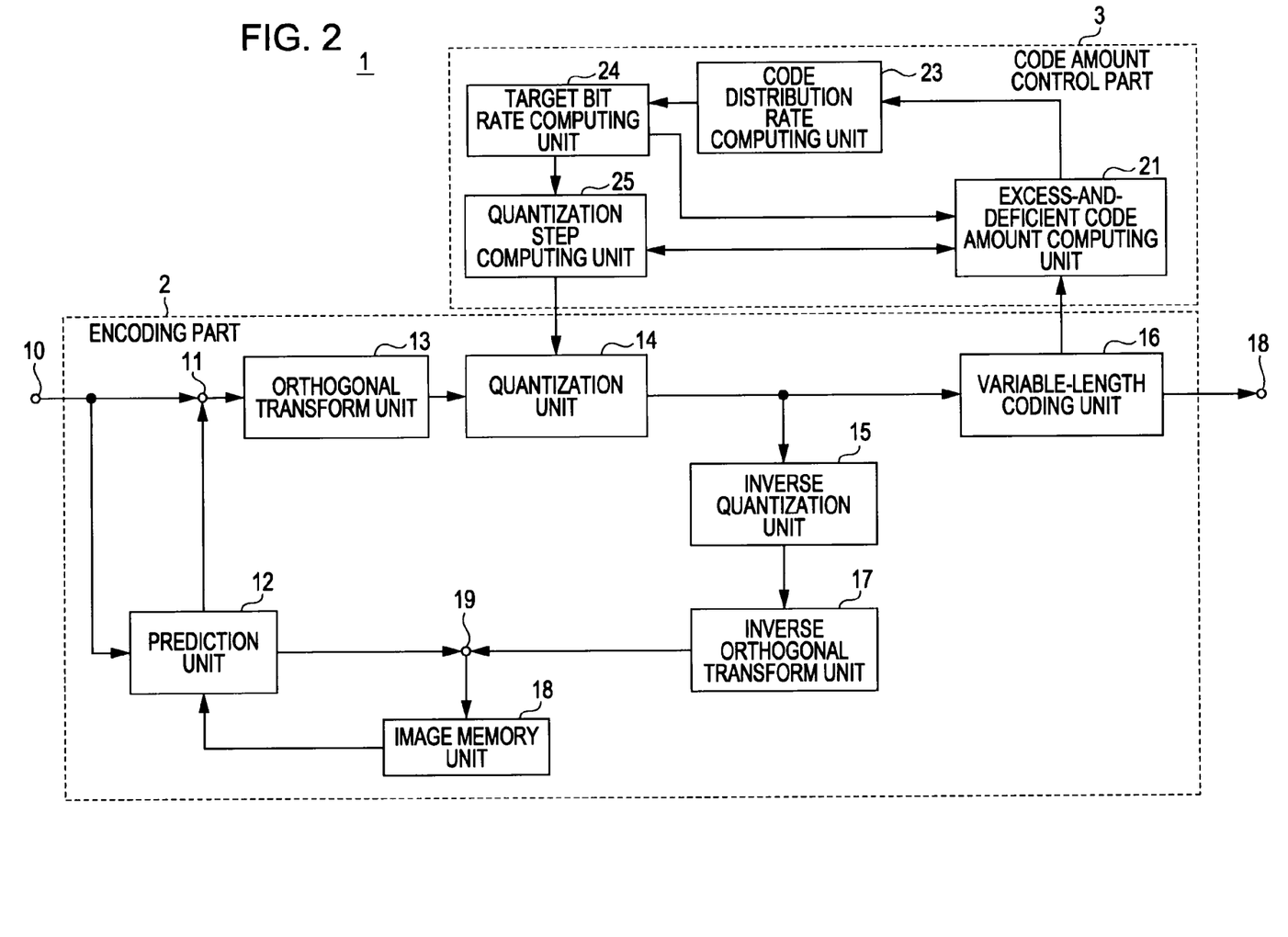
FIG. 2 is a diagrammatic view illustrating the entire structure of an encoder.

In FIG. 2, the reference numeral 1 denotes an encoder as a whole. The encoder 1 includes an encoding part 2 and a code amount control part 3. The encoding part 2 encodes image data supplied from outside sources in accordance with, for example, the MPEG (Moving Picture Experts Group)-2 system. The code amount control part 3 performs rate control by approximating the amount of code that will be a generation code amount generated by encoding the image data (hereinafter, referred to as "bit stream") using the encoding part 2 to a target amount of GOP (Group Of Pictures) code preset for each GOP.

Figure 3A:
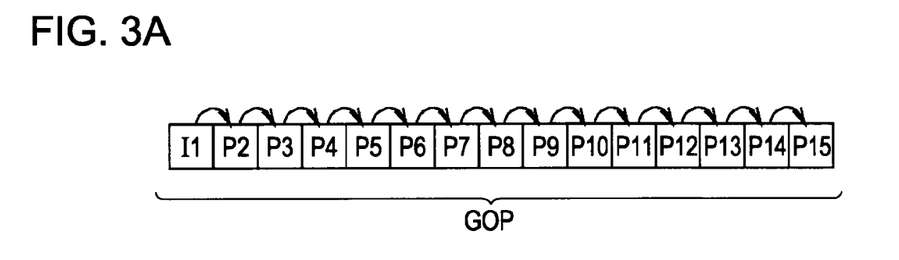
FIGS. 3A and 3B are diagrammatic views illustrating a typical rate control technique (2) according to STEP 1.

As shown in FIG. 3A, the encoder 1 creates a GOP, which is a unit of image processing, including an I-picture at the front and a successive series of P-pictures 2 to 14. The I-picture is generated by using intra-frame coding without changing pixel values thereof. The P-pictures are generated by using forward prediction with reference to the preceding I-picture or P-pictures.

Upon receipt of image data from an external device through an input terminal 10, the encoding part 2 (in FIG. 2) feeds the image data to a subtracter 11 and a prediction unit 12.

If the subtracter 11 is supplied with reference image data from the prediction unit 12, the subtracter 11 creates differential information that represents the difference between the reference image data and the image data and feeds the differential information to an orthogonal transform unit 13. On the other hand, if it is not being supplied with reference image data from the prediction unit 12, the subtracter 11 feeds the image data as differential information to the orthogonal transform unit 13.

The orthogonal transform unit 13 subjects the differential information to orthogonal transform processing, such as discrete cosine transform (DCT), to generate an orthogonal transform coefficient and feeds it to a quantization unit 14. The quantization unit 14 quantizes the orthogonal transform coefficient while changing the quantization step under the control of the code amount control part 3 to generate a quantized coefficient and feeds it to an inverse quantization unit 15 and a variable-length coding unit 16.

The inverse quantization unit 15 inversely quantizes the quantized coefficient to generate a local orthogonal transform coefficient and feeds it to an inverse orthogonal transform unit 17. The inverse orthogonal transform unit 17 subjects the local orthogonal transform coefficient to inverse orthogonal transform processing to generate local differential information and feeds it to an adder 19.

The adder 19 adds chronologically previous local image data supplied from the prediction unit 12 to the differential information to generate current local image data and stores it in an image memory unit 18.

The prediction unit 12 extracts a motion vector from the image data and current local image data and subjects the image data to motion compensation processing. Then, the prediction unit 12 feeds the compensated image data as reference image data to the subtracter 11.

The variable-length coding unit 16 subjects the quantized coefficient fed from the quantization unit 14 to variable-length coding according to a code table to generate a bit stream. Then, the variable-length coding unit 16 feeds the bit stream to the code amount control part 3, while outputting the bit stream to an external device via an output terminal 20.

Based on the amount of code of the bit stream fed by the variable-length coding unit 16, the code amount control part 3 calculates a quantization step to be used by the quantization unit 14.

The code amount control part 3 supplies the bit stream fed from the variable-length coding unit 16 to an excess/deficient code amount computing unit 21.

The excess/deficient code amount computing unit 21 has a target amount of GOP code preset based on a predetermined basic amount of GOP code. The excess/deficient code amount computing unit 21 calculates the difference in amount of code between the bit stream in a coded GOP unit (hereinafter, referred to as "GOP generation code amount") and the target amount of GOP code, and feeds the obtained difference in amount of code to a code distribution rate computing unit 23.

The code distribution rate computing unit 23 calculates a target amount of GOP code for the following GOP by adding the difference in amount of code given by the excess/deficient code amount computing unit 21 to the basic amount of GOP code and feeds the obtained target amount of GOP code to a target bitrate computing unit 24 and the excess/deficient code amount computing unit 21. Consequently, the target amount of GOP code for the following GOP is set in the excess/deficient code amount computing unit 21.

The target bitrate computing unit 24 calculates a target bitrate for the following GOP based on the target amount of GOP code given by the code distribution rate computing unit 23.

In addition, the target bitrate computing unit 24 executes target code amount adjustment processing, which will be described in detail later, to calculate an adjusted target amount of code for each picture based on the target bitrate and feeds the obtained adjusted target amount of code to a quantization step computing unit 25.

Upon receipt of the bit stream for each picture from the variable-length coding unit 16, the excess/deficient code amount computing unit 21 subtracts the code amount of a bit stream of a corresponding picture (hereinafter, referring to as "picture generation code amount S") from the preset target amount of GOP code and calculates a remaining code amount R by the following equation. The picture generation code amount S contains all generation code amounts for every type of picture within a GOP.

$$R = R - S \qquad \text{[Equation 1]}$$

The excess/deficient code amount computing unit 21 feeds the picture generation code amount S and remaining code amount R to the target bitrate computing unit 24. In addition, the excess/deficient code amount computing unit 21 feeds a generation code amount for every macroblock to the quantization step computing unit 25.

The target bitrate computing unit 24 executes target code amount adjustment processing, which will be described in detail later, to calculate an adjusted target amount of code based on the target bitrate, picture generation code amount S and remaining code amount R, and feeds the obtained adjusted target amount of code to the quantization step computing unit 25.

The quantization step computing unit 25 calculates a quantization step, based on the adjusted target amount of code given by the target bitrate computing unit 24 and the generation code amount for each macroblock, so that the picture generation code amount S approximates to the adjusted target amount of code. The quantization unit 14 is designed to generate a quantized coefficient with the obtained quantization step.

With the aforementioned structure, the encoder 1 generates a bit stream so that the picture generation code amount becomes equal to the adjusted target amount of code by the code amount control part 3 that calculates the adjusted target amount of code and performs quantization based on the adjusted target amount of code. The encoder 1 performs rate-control so that the GOP generation code amount approximates to the target amount of GOP code through the target code amount adjustment processing, which will be described later, that calculates the adjusted target amount of code based on the picture generation code amount.

[1-2. Picture Target Code Amount Adjustment Processing]

A description will be made about target code amount adjustment processing performed by the target bitrate computing unit 24 in accordance with a program for adjusting target amounts of code. The target bitrate computing unit 24 is designed to calculate target adjustment code amounts (target adjustment code amounts Ti and TpC) for each picture in accordance with STEP 1 in TM 5 of the MPEG (Moving Picture Experts Group)-2 system.

Specifically, the target bitrate computing unit 24, calculates target amounts of picture code Ti and Tp based on the obtained target bitrate and the picture generation code amount S and remaining code amount R fed by the excess/deficient code amount computing unit 21. According to STEP 1 in TM 5, the picture generation code amount S for each picture is assumed to be the same according to the type of the picture, and therefore the target amount of picture code is almost evenly allocated to pictures of the same type.

Figure 4:
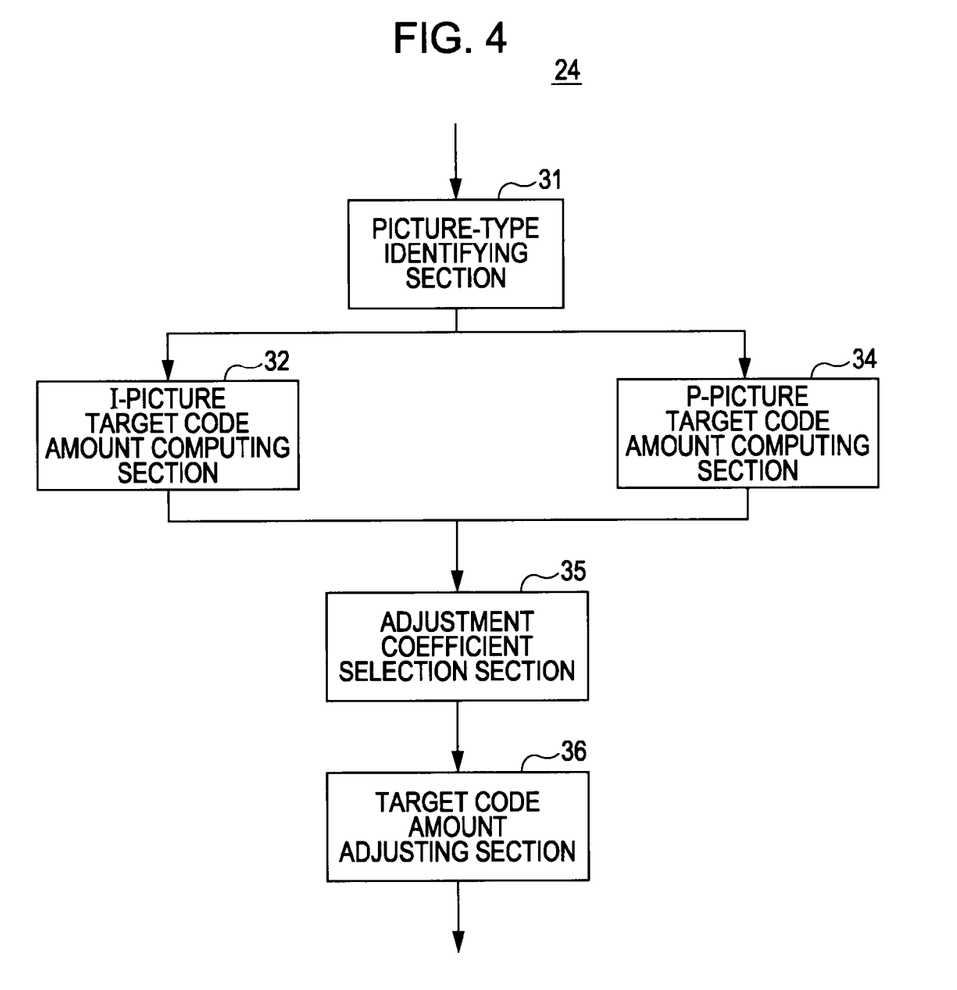
FIG. 4 is a diagrammatic view illustrating the structure of a target bitrate computing unit.

As shown in FIG. 4, a picture-type identifying section 31 in the target bitrate computing unit 24 identifies the picture type (i.e., I-picture or P-picture) and picture number of the picture to be subjected to processing for calculating its target amount of code. If the picture to be processed is an I-picture, the picture-type identifying section 31 feeds the target bitrate to an I-picture target code amount computing section 32.

The I-picture target code amount computing section 32 calculates a parameter Xi by using Equation 2, and then calculates a target amount of picture code Ti by using Equation 3. The I-picture target code amount computing section 32 feeds the target amount of picture code Ti to an adjustment coefficient selection section 35. Note that the bitrate means a target bitrate, and Np and Nb are the number of P-pictures and B-pictures, respectively, which have not been coded yet in a GOP. Because there is no B-picture in this embodiment, Nb typically takes a value of "0".

$$Xi = 160 \times \frac{bitrate}{115} \quad \text{[Equation 2]}$$

$$Ti = \max\left\{\frac{R}{1 + \frac{NpXp}{XiKp} + \frac{NbXb}{XiKb}}, bitrate/(8 \times picturerate)\right\} \quad \text{[Equation 3]}$$

If the picture to be processed is a P-picture, the picture-type identifying section 31 feeds the target bitrate, picture generation code amount S and remaining code amount R, as well as the identified picture number to a P-picture target code amount computing section 34.

The P-picture target code amount computing section 34 calculates a parameter Xp by using Equation 4 and calculates a target amount of picture code Tp by using Equation 5.

$$Xp = 60 \times \frac{bitrate}{115} \quad \text{[Equation 4]}$$

$$Tp = \max\left\{\frac{R}{Np + \frac{NbKbXb}{KbXb}}, bitrate/(8 \times picturerate)\right\} \quad \text{[Equation 5]}$$

The computational algorithm of the target amounts of picture code Ti, Tp and Tb is described in the Journal of the Institute of Television Engineers of Japan, Vol. 49, No. 4 (1995).

Figure 3B:
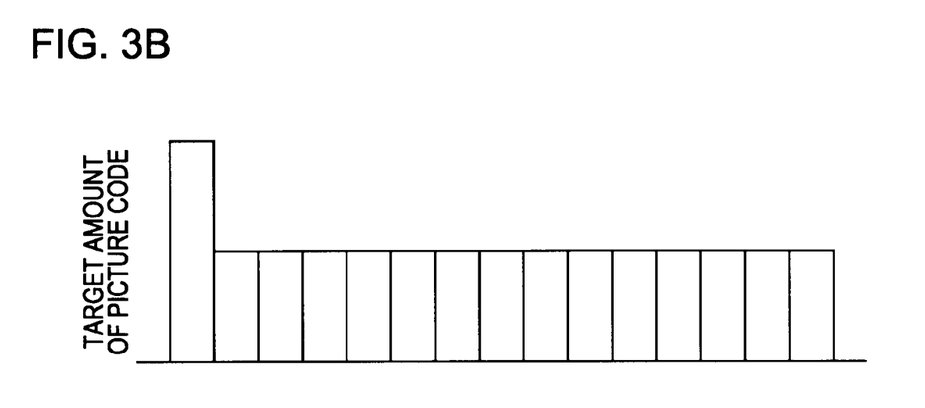

As shown in FIG. 3B, the P-picture target code amount computing section 34 calculates the target amount of picture code Tp so as to be evenly allocated to all P-pictures as with the case of the typical encoders.

The adjustment coefficient selection section 35 stores in advance adjustment coefficients that have an alternating sequence of maximum adjustment coefficient values and minimal adjustment coefficient values obtained by alternately increasing and decreasing an adjustment coefficient as the picture number (i.e., the picture position within a GOP) to be processed shifts by one toward the last picture number in the GOP. The adjustment coefficient selection section 35 selects an adjustment coefficient corresponding to the picture number and feeds it, in addition to the target amounts of picture code Ti and Tp, to a picture target code amount adjusting section 36.

Figure 5A:
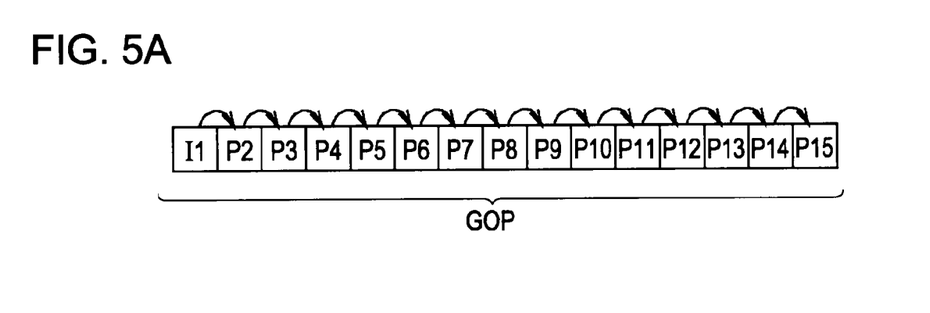
FIGS. 5A, 5B and 5C are diagrammatic views illustrating a rate control technique according to the first embodiment.
Figure 5B:
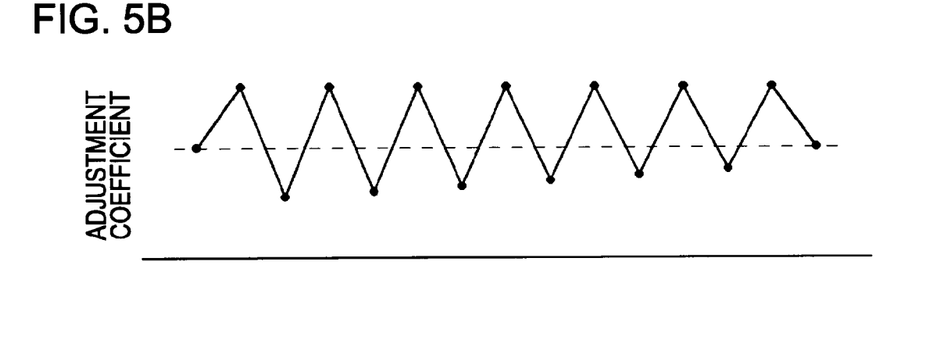

More specifically, the adjustment coefficient selection section 35, as shown in FIG. 5B, selects an adjustment coefficient of "1.5" for the target amounts of picture code Tp of the even-numbered pictures 2, 4, 6, 8, 10, 12, 14, whereas the adjustment coefficient selection section 35 selects an adjustment coefficient starting from "0.5" as a reference value for the target amounts of picture code Tp of the odd-numbered pictures 3, 5, 7, 9, 11, 13.

However, the adjustment coefficient selection section 35 selects an adjustment coefficient of "1.0" for the target amount of picture code Tp of the picture number 15 located in the last position within a GOP in order to fully use the target amount of GOP code so as not to waste any of it. In an analogous way, the adjustment coefficient selection section 35 selects an adjustment coefficient of "1.0" for the target amount of picture code Ti of the I-picture in the first position within the GOP.

In short, the adjustment coefficient selection section 35 selects adjustment coefficients that alternately increase and decrease to give the maximum values to the even-numbered pictures and the minimal values to the odd-numbered pictures.

The picture target code amount adjusting section 36 multiplies the target amounts of picture code Ti and Tp by the adjustment coefficient selected by the adjustment coefficient selection section 35 to determine an adjusted target amount of code TpC. The picture target code amount adjusting section 36 feeds the adjusted target amount of code TpC to the excess/deficient code amount computing unit 21.

More specifically, the picture target code amount adjusting section 36 multiplies the target amounts of picture code Tp of the even-numbered pictures 2, 4, 6, 8, 10, 12, 14 by the adjustment coefficient of "1.5", and the resultant values are referred to as adjusted target amounts of code TpC. The picture target code amount adjusting section 36 multiplies the target amounts of picture code Tp of the odd-numbered pictures 3, 5, 7, 9, 11, 13 by the adjustment coefficients starting from "0.5", and the resultant values are referred to as adjusted target amounts of code TpC.

In addition, the picture target code amount adjusting section 36 multiplies the target amounts of picture code Ti and Tp of the picture numbers 1 and 15 by the adjustment coefficient of "1.0", and the resultant values are referred to as adjusted target amounts of code TiC and TpC, respectively. Note that when the adjustment coefficient is "1.0", the picture target code amount adjusting section 36 can regard the target amounts of picture code Ti and Tp as the adjusted target amounts of code TiC and TpC without multiplication by the adjustment coefficient.

Figure 5C:
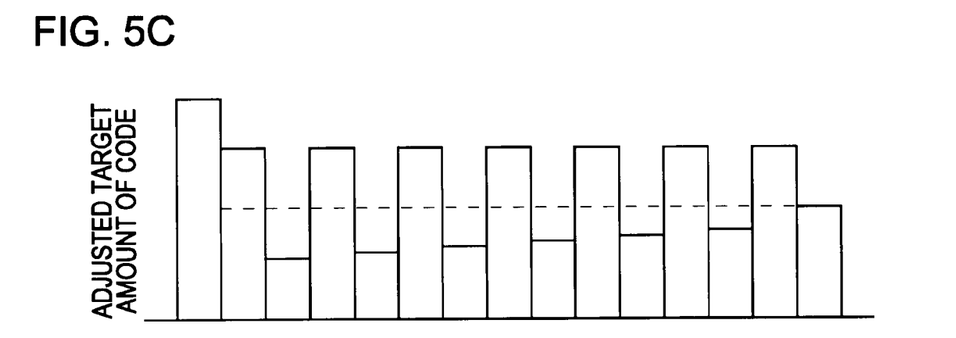

Consequently, as shown in FIG. 5C, the adjusted target amounts of code TpC exhibit alternately increased and decreased values every time the picture number increments by one.

As a result of the processing, the even-numbered P-pictures can have their image quality improved with the increase in the adjusted target amount of code TpC. In addition, the odd-numbered P-pictures can have their image quality deterioration reduced, even though their code amounts are decreased, by referring to the P-pictures of improved image quality. Therefore, the picture target code amount adjusting section 36 can improve image quality of the GOP as a whole in comparison with the ordinal technique which does not use the adjustment coefficient multiplication.

When a person observes alternately arranged good quality images and relatively poor quality images, the person visually perceives the good quality images better than poor quality images. Based on this theory, when an observer views image data obtained by decoding a bit stream on a display device, the picture target code amount adjusting section 36 can make the image seem to be of a higher grade than it really is.

Figure 6A:
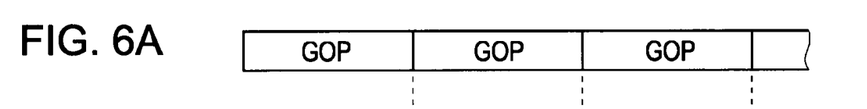
FIGS. 6A and 6B are diagrammatic views illustrating a problem concerning the typical rate control techniques.
Figure 6B:
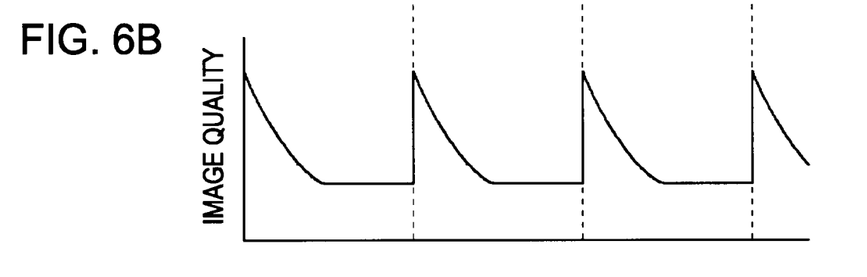

Encoders in the past had allocated more target amount of picture code to an I-picture than to other pictures as shown in FIG. 6B. This caused the encoders to display decoded image data with extremely good quality images whenever the I-picture appears, thereby giving observers the impression that the image has been switched.

The picture target code amount adjusting section 36 increases the adjusted target amount of code TpC for the P-picture immediately after an I-picture (i.e., picture number 2). This operation of the picture target code amount adjusting section 36 can improve image quality of the picture immediately after the I-picture.

The picture target code amount adjusting section 36 increases the adjusted target amount of code TpC for the picture immediately before the last P-picture in the GOP (i.e., picture number 14). This operation of the picture target code amount adjusting section 36 can improve image quality of the last P-picture (i.e., picture number 15) followed by the next I-picture.

Figure 7A:
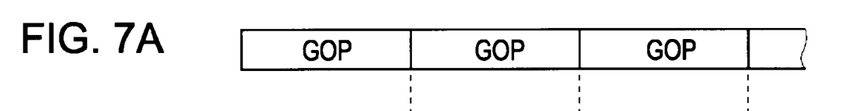
FIGS. 7A and 7B are diagrammatic views illustrating improvement in image quality between GOPs according to the first embodiment.
Figure 7B:
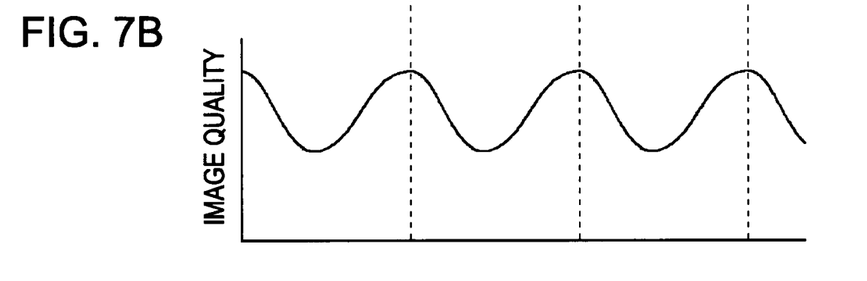

In other words, the picture target code amount adjusting section 36 can improve image quality of two pictures immediately before the I-picture and one picture immediately after the I-picture. As a result, the picture target code amount adjusting section 36 can seamlessly connect GOPs without noticeable I-pictures, as shown in FIGS. 7A and 7B and can improve image quality of decoded image data as a whole.

Furthermore, the picture target code amount adjusting section 36 selects an adjustment coefficient corresponding to each of the odd-numbered pictures 3, 5, 7, 9, 11, 13 so that the adjustment coefficients gradually increase from the reference value of "0.5" as the picture to be processed is changed to the latter picture in the GOP.

More concretely, the picture target code amount adjusting section 36 multiplies the target amounts of picture code Tp of the odd-numbered pictures 3, 5, 7, 9, 11, 13 by adjustment coefficients of 0.523, 0.523, 0.531, 0.539, 0.555, 0.602, respectively.

Thus, the picture target code amount adjusting section 36 can gradually improve image quality of the pictures toward the last picture in a GOP, and therefore can improve image quality of the pictures positioned in the latter part of the GOP, which are likely to be deteriorated due to propagation of errors caused by reference. Accordingly, the picture target code amount adjusting section 36 can equalize image quality of pictures in the first half and pictures in the latter half of the GOP and therefore can seamlessly connect the GOPs.

The above-described series of the target code amount adjustment processing is feasible with hardware or software. In the case of executing the target code amount adjustment processing with software, the target bitrate computing unit 24 is virtually formed in a CPU (Central Processing Unit) and RAM (Random Access Memory). Loading a variable-length decoding program stored in a ROM into the RAM starts the target code amount adjustment processing.

The target bitrate computing unit 24 thus calculates the target amounts of picture code Tp so as to equalize image quality of every picture. Then, the target bitrate computing unit 24 multiplies the target count by the adjustment coefficient corresponding to the picture number so that the determined adjusted target amounts of code TpC alternately increase and decrease.

With this operation, the target bitrate computing unit 24 can generate odd-numbered P-pictures having a small code amount by letting them refer to the even-numbered P-pictures having a large code amount. The target bitrate computing unit 24 reduces the image quality deterioration of the odd-numbered P-pictures, while improving the image quality of the even-numbered P-pictures, thereby improving the image quality of the GOP as a whole.

[1-3. Specific Procedure]

Figure 8:
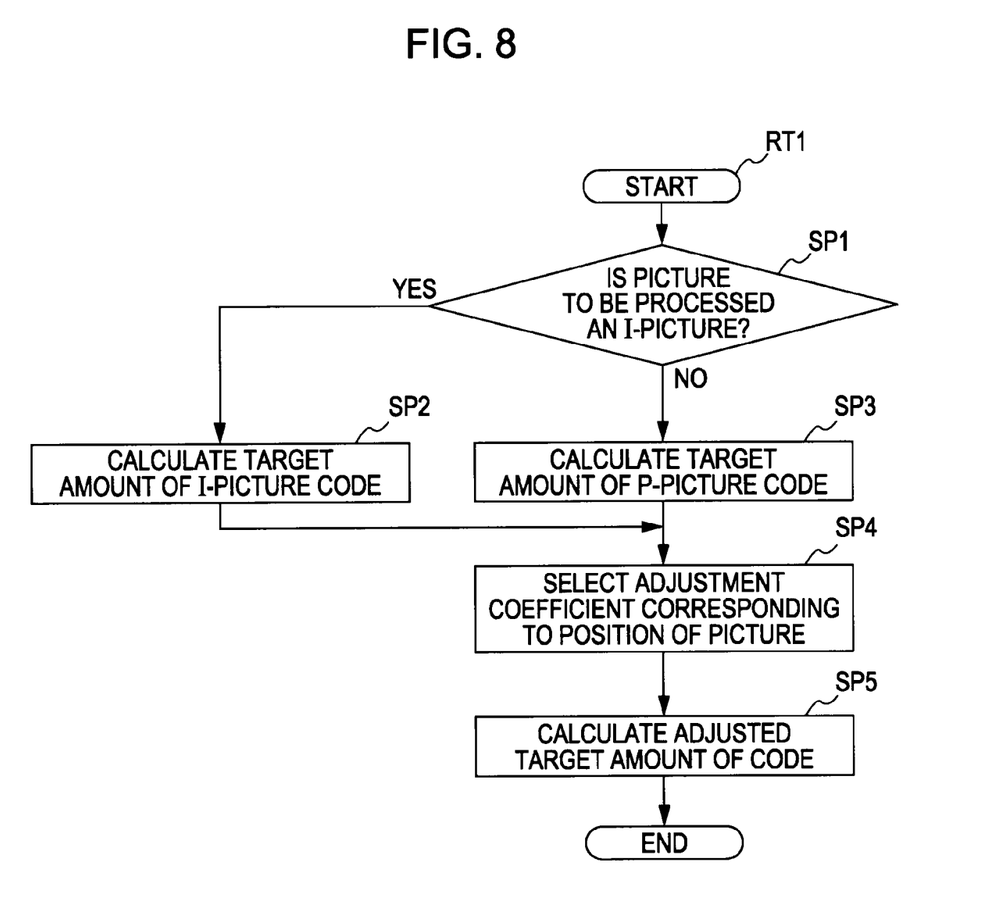
FIG. 8 is a flow chart illustrating a procedure of target code amount adjustment processing.

With reference to the flow chart in FIG. 8, a description will be made about target code amount adjustment processing executed in accordance with a target code amount adjustment processing procedure RT1.

Upon receipt of information about a picture generation code amount and a remaining code amount from the excess/deficient code amount computing unit 21, the target bitrate computing unit 24 starts the target code amount adjustment processing procedure RT1 from step SP1.

In step SP1, the target bitrate computing unit 24 identifies whether the picture to be processed is an I-picture. If the result is affirmative, the target bitrate computing unit 24 takes the following step SP2 because the picture is an I-picture.

In step SP2, the target bitrate computing unit 24 calculates a target amount of picture code Ti for the I-picture by using Equations 2 and 3, and then goes to the last step to complete the target code amount adjustment processing procedure RT1.

Contrarily, if the result is negative in step SP1, the target bitrate computing unit 24 goes to the following step SP3 because the picture to be processed is a P-picture.

In step SP3, the target bitrate computing unit 24 calculates a target amount of picture code Tp for the P-picture by using Equations 4 and 5, while renewing the remaining code amount R by using Equation 1, and goes to the following step SP4.

In step SP4, the target bitrate computing unit 24 selects an adjustment coefficient corresponding to the picture number from adjustment coefficients that have an alternating sequence of maximum values and minimal values in the order of the picture number, and goes to the following step SP5.

In step SP5, the target bitrate computing unit 24 multiplies the target amount of picture code Ti and Tp obtained in step SP3 by the adjustment coefficient corresponding to the picture number to determine adjusted target amounts of code TiC and TpC, and goes to the last step to complete the target code amount adjustment processing procedure RT1.

[1-4. Operation and Effect]

With the above-described structure, the encoder 1 calculates a target amount of picture code Tp which is a target amount of code necessary for a picture to encode image data. The encoder 1 selects an adjustment coefficient corresponding to the position of a picture (i.e., picture number) within a GOP, which is a unit of image processing, from adjustment coefficients that have an alternating sequence of maximum values and minimal values obtained by alternately increasing and decreasing the adjustment coefficient every time the page number increments by one. The encoder 1 multiplies the target picture code amount Tp by the selected adjustment coefficient to adjust the target amount of picture code Tp, and determines an adjusted target amount of code TpC.

The encoder 1 generates bit streams whose code amounts repeatedly increase and decrease so as to alternately present pictures with large amounts of code and pictures with reduced amounts of code. The encoder 1 can improve the image quality of the pictures with large amounts of code, while reducing image quality deterioration of the pictures with the reduced amounts of code by encoding the pictures with the reduced amounts of code with reference to the pictures with improved image quality. This allows the encoder 1 to improve image quality of a GOP as a whole.

The encoder 1 calculates target amounts of picture code Tp so as to be almost evenly allocated to pictures of the same type. The encoder 1 can change the evenly allocated target amounts of picture code into adjusted target amounts of code TpC whose values alternate between the maximum and minimum, thereby encoding image data so that the amount values of picture code Ti and Tp alternate between the maximum and minimum.

For the picture to be encoded subsequent to an I-picture, the encoder 1 selects an adjustment coefficient of more than 1.

Because the encoder 1 can improve the image quality of the picture immediately after the I-picture to which the largest amount of code is allocated, the I-picture and the following picture with relatively lower image quality can be naturally connected to each other without allowing the I-picture to stand out.

The encoder 1 calculates target amounts of picture code Tp so that the code amount of a bit stream is equal to a target amount of GOP code set to every GOP, and selects an adjustment coefficient of 1 for the last picture in the GOP.

With this technique, the encoder 1 can allocate all the remaining code amounts, which are obtained by subtracting the code amount of an encoded bit stream from the target amount of GOP code, as the adjusted target amounts of code Tp, and therefore does not leave redundant code amounts.

The encoder 1 selects an adjustment coefficient of more than 1 for the picture immediately before the last picture in a GOP (i.e., picture number 14).

The encoder 1 can encode the last picture in the GOP with respect to a picture with good image quality, and can improve the image quality of the two pictures immediately before an I-picture which is in a forefront of the next GPO.

With this approach, the encoder 1 can improve the image quality of the picture immediately before the I-picture to which the largest code amount is allocated, and therefore GOPs can be seamlessly connected to each other without allowing the I-picture to stand out.

The encoder 1 is designed to select a higher adjustment coefficient value every time the picture to be processed shifts toward the last picture in a GOP (i.e., as the picture number increments).

The encoder 1 can gradually improve the image quality of the pictures toward an I-picture in the next GOP, thereby further seamlessly connecting GOPs.

Each GOP contains an I-picture and P-pictures. Because this GOP structure allows all pictures to be used as a reference picture, the encoder 1 can establish a relationship between pictures with improved image quality and pictures with reduced code amounts that are encoded with reference thereto, and fully exerts the effect of the present invention.

According to the above-described structure, the encoder 1 sets the adjusted target amount of code so that the code amounts of every picture in a bit stream within a GOP alternately increase and decrease. The encoder 1 encodes image data so that the code amount of the bit stream corresponding to the pictures meets the adjusted target amount of code.

The encoder 1 brings the image quality of pictures having a large code amount to that of the I-picture, and therefore can improve the image quality of every other picture. When a decoded image is displayed, the encoder 1 can give the impression to observers that the image quality of the entire decoded image data has been improved by periodically showing only the pictures with improved image quality. Accordingly, the present invention can realize an encoding device, a method for adjusting target amounts of code and record media storing a program for adjusting the target amounts of code, which are capable of improving image quality.

2. Second Embodiment

Figure 9:
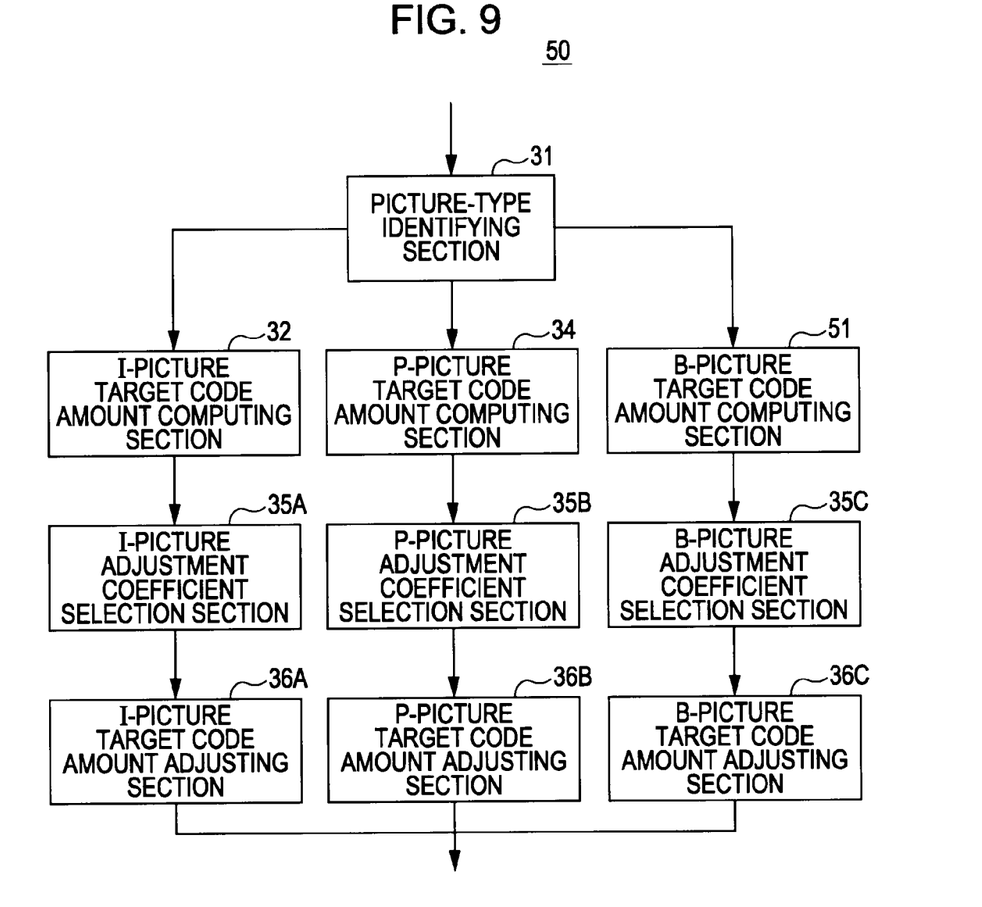
FIG. 9 is a diagrammatic view illustrating the structure of a target bitrate computing unit according to the second embodiment.

The second embodiment is illustrated in FIG. 9 wherein like parts are designated by like reference numerals as of the first embodiment shown in FIGS. 1 to 8. The second embodiment is different from the first embodiment in that a GOP contains B-pictures in addition to an I-picture and P-pictures. The second embodiment is also different from the first embodiment in provision of adjustment coefficient selection units and target code amount adjusting units each for the respective I-picture, P-picture and B-picture.

As shown in FIG. 9, when the picture to be processed is an I-picture, an I-picture target code amount computing section 32 in a target bitrate computing unit 50 generates a target amount of picture code Ti by using Equation 2, and feeds it to an I-picture adjustment coefficient selection section 35A. Nb denotes the number of the B-picture that has not been coded, and Kb is the rate of quantization scale according to the B-picture. Kb=1.4.

The I-picture adjustment coefficient selection section 35A selects an adjustment coefficient of "1.0" corresponding to the picture number and feeds it to an I-picture target code amount adjusting section 36A. The I-picture target code amount adjusting section 36A multiplies the target amount of picture code Ti by the adjustment coefficient of "1.0" to generate an adjusted target amount of code TiC.

A P-picture target code amount computing section 34 generates a target amount of picture code Tp by using Equations 4 and 5. A P-picture target code amount adjusting section 36B multiplies the target amount of picture code Tp by an adjustment coefficient selected by a P-picture adjustment coefficient selection section 35B corresponding to the picture number to determine an adjusted target amount of code TpC.

A B-picture target code amount computing section 51 calculates a target amount of B-picture code Tb of the first B-picture in the GOP by using Equations 6 and 7.

$$Xb = 42 \times \frac{bitrate}{115}$$ [Equation 6]

$$Tb = \max\left\{\frac{R}{Nb + \frac{NpKbXp}{KpXb}}, bitrate/(8 \times picturerate)\right\}$$ [Equation 7]

A B-picture target code amount adjusting section 36C multiplies the target amount of B-picture code Tb by an adjustment coefficient selected by a B-picture adjustment coefficient selection section 35C corresponding to the picture number to generate an adjusted target amount of code TbC.

Consequently, the excess/deficient code amount computing unit 21 is supplied with the adjusted target amounts of code TiC, TpC and TbC.

The target bitrate computing unit 50 multiplies the target amounts of P-picture code Tp and target amount of B-picture codes Tb of even-numbered pictures among the pictures excluding the first and the last pictures in the GOP by adjustment coefficients of more than 1 to generate adjusted target amounts of code TpC and TbC. The target bitrate computing unit 50 multiplies the target amounts of picture code Tp and Tb of odd-numbered pictures by adjustment coefficients of less than 1 to generate adjusted target amounts of code TpC and TbC.

Thus, the target bitrate computing unit 50, as with the first embodiment, can generate the target amounts of picture code for all the pictures, except for the first and the last pictures, in a GOP, so as to alternately increase and decrease, thereby improving the image quality of the GOP as a whole.

3. Other Embodiments

The aforementioned first and second embodiments describe that the target bitrate computing unit 24 calculates the target amount of picture code Tp so that the almost equal target amounts of picture code are allocated to pictures of the same type. The target bitrate computing unit 24 multiplies the target amount of picture code Tp by an adjustment coefficient corresponding to the position of the picture (i.e., picture number) in a GOP, which is a unit of image processing, from adjustment coefficients that have an alternating sequence of the maximum adjustment coefficient values and minimal adjustment coefficient values. With the adjustment coefficient values, the target bitrate computing unit 24 adjusts the target amount of picture code Tp and calculates an adjusted target amount of code TpC. However, the present invention is not limited thereto. For example, the target amount of picture code, which will be multiplied by an adjustment coefficient, can be calculated according to the complexity of the picture. Alternatively, the alternating sequence of the maximum adjusted target amounts of code TpC and the minimal adjusted target amounts of code TpC can be directly calculated without calculation of the target amounts of picture code Tp.

In addition, the aforementioned first and second embodiments describe that adjustment coefficients of more than 1 are selected for the pictures to be coded subsequent to the I-picture; however, the present invention is not limited thereto. As long as the adjustment coefficients can make the adjusted target amounts of code for respective pictures alternately increase and decrease, it is permitted to select an adjustment coefficient of less than 1.

Furthermore, the aforementioned first and second embodiments describe that a GOP includes 15 pictures, which is odd; however, the present invention is not limited thereto. The present invention does not limit the number of pictures in a GOP, and the number of pictures may be odd or even.

The aforementioned first and second embodiments describe that the image processing is performed on a GOP-by-GOP basis; however, the present invention is not limited thereto, and other various groups can be the unit of image processing.

The aforementioned first and second embodiments describe that the target amount of picture code Tp is calculated according to STEP 1 of TM5 of MPEG-2; however, the present invention is not limited thereto, other various methods can be used to determine the target amount of picture code Tp.

In addition, the aforementioned first and second embodiments describe that an adjustment coefficient of more than 1 is multiplied for the picture immediately before the last picture in a GOP; however, the present invention is not limited thereto. As long as the adjustment coefficients can make the adjusted target amounts of code for respective pictures alternately increase and decrease, it is permitted to select an adjustment coefficient of less than 1.

Furthermore, the aforementioned first and second embodiments describe that the minimal adjustment coefficient values of less than 1 increase every time the picture to be processed shifts toward the last picture in a GOP; however, the present invention is not limited thereto. For example, the minimal adjustment coefficient values can be increased forward and backward from the center of the GOP while alternately increasing and decreasing. Alternatively, the maximum adjustment coefficient values and the minimal adjustment coefficient values may be set to be the same. In another embodiment of the present invention, the maximum adjustment coefficient values may be set to increase like the minimal adjustment coefficient values.

The aforementioned embodiments describe that the program for adjusting the target amounts of code is stored in advance in a ROM, hard disk drive or other storage devices; however, the present invention is not limited thereto, and the program can be installed to a flash memory device or the like from an external storage such as Memory Stick (registered trademark of Sony Corporation). In addition, the program for adjusting the target amount of code or the like may be acquired from outside sources via a wireless LAN (Local Area Network), such as USB (Universal Serial Bus), Ethernet (registered trademark) (Institute of Electrical and Electronics Engineers: registered trademark) 802.11a/b/g, or distributed by Terrestrial Digital Television Broadcasting or BS (Broadcasting Satellite) Digital Television Broadcasting.

The aforementioned first and second embodiments describe that the present invention is applied to an encoder 1 adhered to MPEG-2; however, the present invention is not limited thereto and is applicable to encoders of various standards. For example, the present invention can be applied to encoders adhered to MPEG-4, AVC (Advanced Video Coding), VC-1 standardized from Windows (registered trademark) Media Video 9, JPEG (Joint Photographic Experts Group) and so on.

Furthermore, according to the aforementioned first embodiment, an encoder 1 as an encoding device includes an encoding part 2 as an encoding unit, a P-picture target code amount computing section 34 as a computing unit, an adjustment coefficient selection section 35 as a selection unit, a picture target code amount adjusting section 36 as an adjusting unit. However, the present invention is not limited thereto, and the encoding device of the present invention can include an encoding unit, a computing unit, a selection unit, an adjusting unit, each of which has various different configurations.

The present application contains subject matter related to that disclosed in Japanese Priority Patent Application JP 2009-001891 filed in the Japan Patent Office on Jan. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding device comprising:
an encoding unit that encodes image data;
a computing unit that calculates a target amount of picture code for each picture when the image data is encoded;
a selection unit that selects an adjustment coefficient corresponding to a position of a picture within a unit of image processing from adjustment coefficients that have an alternating sequence of maximum values and minimal values; and
an adjusting unit that adjusts the target amount of picture code by multiplying the target amount of picture code calculated by the computing unit by the adjustment coefficient selected by the selection unit, wherein
the selection unit selects progressively larger minimal values for the adjustment coefficients as the pictures corresponding to the minimal values shift toward the last picture in the unit of image processing.

2. The encoding device according to claim 1, wherein the selection unit selects an adjustment coefficient of more than 1 for the picture to be coded after an I-picture.

3. The encoding device according to claim 2, wherein the computing unit calculates the target amount of code so that the code amount of a bit stream encoded by the encoding unit is equivalent to a target amount of image-processing-unit code preset for each unit of image processing, and
the selection unit selects an adjustment coefficient of 1 for the last picture in the unit of image processing.

4. The encoding device according to claim 3, wherein the selection unit selects an adjustment coefficient of more than 1 for the picture immediately before the last picture in the unit of image processing.

5. The encoding device according to claim 4, wherein the selection unit selects, respectively for the maximum and minimal values, a higher adjustment coefficient relative to the previous maximum or minimal value every time the picture to be processed shifts toward the last picture in the unit of image processing.

6. The encoding device according to claim 5, wherein the computing unit calculates the target amount of picture code to be substantially uniform for pictures of the same type.

7. The encoding device according to claim 1, wherein the unit of image processing includes an I-picture and P-pictures.

8. The encoding device according to claim 7, wherein the encoding unit encodes image data in compliance with MPEG-2 system.

9. The encoding device according to claim 8, wherein the unit of image processing is a Group Of Pictures (GOP) in the MPEG-2 system format.

10. The encoding device according to claim 1, wherein the selection unit selects adjustment coefficients that alternately increase and decrease such that the maximum values are given to even-numbered pictures and the minimal values are given to odd-numbered pictures.

11. The encoding device according to claim 1, wherein the encoder encodes the image data based on the adjusted target amount of picture code.

12. The encoding device according to claim 11, wherein
the selection unit selects the minimal adjustment coefficient for the first odd numbered picture included in the unit of image processing, and
the selection unit selects progressively larger adjustment coefficients when the odd numbered picture to be processed shifts toward the last picture in the unit of image processing.

13. The encoding device according to claim 1, wherein
the maximum adjustment coefficient value is maintained constant, and
the selection unit selects the maximum adjustment coefficient value for all even numbered pictures included in the unit of image processing.

14. A method for adjusting target amounts of code, the method comprising:
calculating target amounts of picture code when image data is encoded so as to be substantially uniform for pictures of the same type;
selecting an adjustment coefficient corresponding to a position of a picture in a unit of image processing from adjustment coefficients that have an alternating sequence of maximum values and minimal values; and
adjusting the target amount of picture code by multiplying the target amount of picture code calculated by the computing unit by the adjustment coefficient selected by the selection unit, wherein
progressively larger minimal values for the adjustment coefficients are selected as the pictures corresponding to the minimal values shift toward the last picture in the unit of image processing.

15. A non-transitory computer readable medium having instructions stored therein that when executed by a processor causes a computer to perform a method comprising:
calculating target amounts of picture code when image data is encoded so as that the target amounts to be substantially uniform for pictures of the same type;
selecting an adjustment coefficient corresponding to a position of a picture in a unit of image processing from adjustment coefficients that have an alternating sequence of maximum values and minimal values; and
adjusting the target amount of picture code by multiplying the target amount of picture code calculated by the computing unit by the adjustment coefficient selected by the selection unit, wherein progressively larger minimal values for the adjustment coefficients are selected as the pictures corresponding to the minimal values shift toward the last picture in the unit of image processing.

* * * * *